(12) United States Patent
Takemoto et al.

(10) Patent No.: US 9,674,481 B2
(45) Date of Patent: *Jun. 6, 2017

(54) TELEVISION CAMERA

(71) Applicant: Panasonic Intellectual Property Management Co., Ltd., Osaka (JP)

(72) Inventors: Shinji Takemoto, Osaka (JP); Shoichi Fuse, Osaka (JP); Kazumasa Motoda, Osaka (JP); Akiyuki Noda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 211 days.

This patent is subject to a terminal disclaimer.

(21) Appl. No.: 14/703,153

(22) Filed: May 4, 2015

(65) Prior Publication Data
US 2015/0237297 A1    Aug. 20, 2015

Related U.S. Application Data

(63) Continuation of application No. 10/544,876, filed as application No. PCT/JP2004/001994 on Feb. 20, 2004, now Pat. No. 9,055,270.

(30) Foreign Application Priority Data

Feb. 24, 2003   (JP) ................. 2003-004590

(51) Int. Cl.
*H04N 5/93* (2006.01)
*G11B 27/00* (2006.01)
(Continued)

(52) U.S. Cl.
CPC ..... *H04N 7/0105* (2013.01); *G11B 20/10527* (2013.01); *H04N 5/05* (2013.01);
(Continued)

(58) Field of Classification Search
CPC ........ H04N 5/931; H04N 5/932; H04N 5/935; H04N 9/80; H04N 5/93; H04N 5/92; G11B 27/00
(Continued)

(56) References Cited

U.S. PATENT DOCUMENTS 5,818,522 A * 10/1998 Sato ................. H04N 9/045
348/222.1
6,847,401 B1 * 1/2005 Ohtsuru ............ H04N 3/1562
348/272

(Continued)

FOREIGN PATENT DOCUMENTS

EP    1168833 A2    1/2002
EP    1487208 A1    12/2004
(Continued)

OTHER PUBLICATIONS

Summons to attend oral proceedings pursuant to Rule 115(1) EPC issued in European Application No. 04713203.0, dated Sep. 8, 2016.
(Continued)

*Primary Examiner* — Daquan Zhao
(74) *Attorney, Agent, or Firm* — McDermott Will & Emery LLP

(57) ABSTRACT

A first video signal having a first frame rate optionally settable is generated by an image pickup device, and the first video signal is memorized in a memory and outputted from the memory. A write control device controls the write of the first video signal with respect to the memory, and a read control device controls the read of the video signal with respect to the memory. The write control device writes respective first frame data constituting the first video signal in the memory in each cycle determined by the first frame rate of the first video signal. The read control device reads the first frame data as a second video signal. The second video signal is formed from sequentially arranging the first (Continued)

frame data in a partially duplicating manner in a standard video signal having a standard frame rate based on a determined arrangement rule. The predetermined arrangement rule is an arrangement rule employed when respective frame data constituting a video signal having a second frame rate equal to or lower than the standard frame rate are arranged in a duplicating manner in the standard video signal. In the foregoing manner, an time elongation/contraction effect on an image can be speedily and inexpensively obtained.

5 Claims, 12 Drawing Sheets

(51) Int. Cl.
| | | |
|---|---|---|
| *H04N 5/92* | (2006.01) | |
| *H04N 9/80* | (2006.01) | |
| *H04N 7/01* | (2006.01) | |
| *H04N 5/77* | (2006.01) | |
| *G11B 20/10* | (2006.01) | |
| *H04N 5/05* | (2006.01) | |
| *H04N 5/372* | (2011.01) | |
| *H04N 5/931* | (2006.01) | |
| *H04N 5/932* | (2006.01) | |
| *H04N 5/935* | (2006.01) | |

(52) U.S. Cl.
CPC ............ *H04N 5/372* (2013.01); *H04N 5/772* (2013.01); *G11B 2020/10592* (2013.01)

(58) Field of Classification Search
USPC ........ 386/209, 210, 239, 278, 279, 326, 353
See application file for complete search history.

(56) References Cited

U.S. PATENT DOCUMENTS

| | | | | |
|---|---|---|---|---|
| 9,055,270 | B2* | 6/2015 | Takemoto | H04N 5/772 |
| 2005/0104957 | A1* | 5/2005 | Okamoto | G11B 27/034 |
| | | | | 348/97 |
| 2005/0200695 | A1* | 9/2005 | Maeda | H04N 5/44591 |
| | | | | 348/14.02 |

FOREIGN PATENT DOCUMENTS

| | | |
|---|---|---|
| JP | 2002-152569 A | 5/2002 |
| WO | 02-39737 A1 | 5/2002 |
| WO | 03/079684 A1 | 9/2003 |

OTHER PUBLICATIONS

Wisell, David: "Panasonic's variable-frame-rate camcorder", Broadcast Engineering, Dec. 1, 2001, 2 pages.

XP-002460221, Panasonic AJ-HDC27V HD Cinema Camera, SMS Productions, Inc., Nov. 27, 2007, 3 pages.

Wiswell, David, et al.,: "Utilizing Overcrank/Undercrank Video from the Panasonic Variable Frame Rate High Definition Camera", Panasonic Technology Overdrive, pp. 1-5.

Panasonic, "A variable frame-rate camera for anHD multi-media world", AJ-HDC27F, 14 pages.

European Search Report issued in EP04713203.0, dated Sep. 12, 2013.

Supplementary European Search Report issued in European Patent Application No. 04713203.0-1241/1599035 PCT/JP2004001994, dated Feb. 1, 2010.

Notice of Allowance issued in U.S. Appl. No. 10/544,876, dated Feb. 4, 2015.

Notice of Allowance issued in U.S. Appl. No. 10/544,876, dated Nov. 25, 2014.

Final Office Action issued in U.S. Appl. No. 10/544,876, dated Feb. 23, 2011.

Office Action issued in U.S. Appl. No. 10/544,876, dated Sep. 16, 2010.

Final Office Action issued in U.S. Appl. No. 10/544,876, dated Nov. 24, 2009.

Office Action issued in U.S. Appl. No. 10/544,876, dated Apr. 13, 2009.

European Search Report issued in European Application No. 15164195.8 dated Aug. 27, 2015.

* cited by examiner

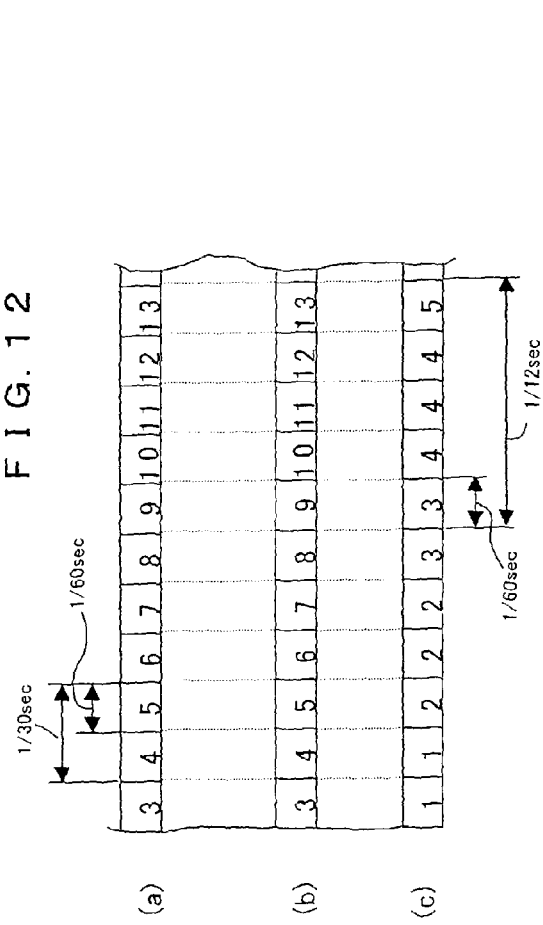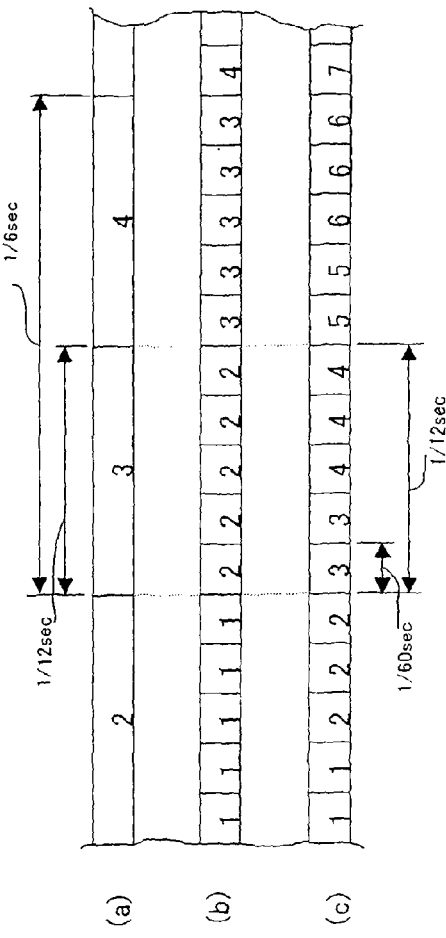

TELEVISION CAMERA

CROSS REFERENCE TO RELATED APPLICATIONS

This application is a Continuation of U.S. application Ser. No. 10/544,876, filed on Aug. 9, 2005, now U.S. Pat. No. 9,055,270, which is the U.S. national phase application of PCT international application PCT/JP2004/001994, filed on Feb. 20, 2004, which claims priority to Japanese Application No. 2003-004590, filed on Feb. 24, 2003, the disclosures of which applications are incorporated by reference herein.

FIELD OF THE INVENTION

The present invention relates to a television camera capable of picking up a video signal based on an optionally settable frame rate.

BACKGROUND TECHNOLOGY

A television camera in which a recording device is integrally incorporated comprising an image pickup device (CCD device or the like) capable of optionally setting a frame rate is conventionally available. Further, an image processing system in which the television camera and a frame rate converting device are combined with each other so that a complicated time elongation/contraction effect can be imparted to an outputted image is also conventionally available. An example of the conventional image processing system is recited in P5-P10 and FIG. 1 of No. 2000-152569 of the Publication of the Unexamined Japanese Patent Applications.

In the conventional image processing system, the time elongation/contraction effect on the image cannot be ultimately confirmed until an output of the frame rate converting device is reproduced. However, the frame rate converting device has a size and a mass unsuitable for portability and therefore cannot be brought into a photographing site. Due to the disadvantage, image data obtained by the image pickup (video tape) has to be brought into a location where the frame rate converting device is installed so that the time elongation/contraction effect can be confirmed through reproducing and converting processes implemented by the frame rate converting device. Such an inconvenience is a barrier to the reduction of a time length required for the photographing (speedier photographing).

Further, an imaging cost reduction cannot be promoted because the frame rate converting device, which is costly, is indispensable for obtaining the time elongation/contraction effect on the image.

Therefore, a main object of the present invention is to speedily and inexpensively obtain the time elongation/contraction effect on the image.

DISCLOSURE OF THE INVENTION

1) A television camera according to the present invention is a television camera provided with an image pickup device for generating a first video signal having an optionally settable first frame rate, comprising:
a memory device for temporarily memorizing the first video signal outputted from the image pickup device;
a write control device for controlling the write of the first video signal with respect to the memory device; and
a read control device for controlling the read of the video signal memorized in the memory device.

The write control device controls the write of respective first frame data constituting the first video signal with respect to the memory device in each time cycle determined by the first frame rate.

The read control device controls the read of the first frame data memorized in the memory device as a second video signal.

The second video signal is a video signal having a signal mode in which the respective first frame data are sequentially arranged in a partially duplicating manner in a standard video signal having a standard frame rate determined by an output standard format of the television camera based on a predetermined arrangement rule. The read control device generates the second video signal having the foregoing signal mode.

The predetermined arrangement rule refers to an arrangement rule used when respective frame data constituting a video signal having a second frame rate equal to or lower than the standard frame rate (standard frame rate second frame rate) are arranged in a duplicating manner in the standard video signal in such manner that they correspond to one another in terms of real time on an image. The read control device generates the second video signal based on the foregoing arrangement rule.

The second video signal outputted from the memory device is thereby given a time-image effect, which allows the video signal with the time contraction effect on the image to be outputted by means of the television camera alone. Further, the television camera, which is additionally provided with only the memory device and the control devices for controlling the read and write with respect to the memory device, does not incur a large increase in size (increase in weight) and cost.

In a modification example of the television camera according to the present invention, the first video signal generated by the image pickup device includes a video signal generated in a temporally at-random intermittent imaging. According to the constitution, a width of an effect obtained by a special photographing can be widened.

In another modification example of the television camera according to the present invention, a recorder for recording the second video signal is further included. According to the constitution, the second video signal with a special effect can be photographed and memorized at the same time, which is more convenient in the photographing.

In still another modification example of the television camera according to the present invention, a display device for displaying the second video signal outputted from the memory device is further included. According to the constitution, the time-image effect given to the second video signal can be confirmed immediately after the photographing when the display device is visually checked.

In still another modification example of the television camera according to the present invention, a converting device for converting the first video signal into the standard video signal having the standard frame rate determined by the output standard format of the television camera, a selecting device for selecting from the second video signal outputted from the memory device and the standard video signal outputted from the converting device, and a display device for displaying an output of the selecting unit are further included. According to the constitution, an image of the second video signal with the time-image effect and an image of the first video signal which is a real-time image with no time-image effect can be selected by the selecting device and accordingly displayed on the display device. As a result, the real-time image and the image with the time-image effect can be compared to each other on the television camera.

BRIEF DESCRIPTION OF THE DRAWINGS

FIG. 12 is a timing chart of a basic operation of the television camera according to the present invention.

FIG. 13 is a timing chart of a basic operation of the television camera according to the present invention.

DESCRIPTION OF THE PREFERRED EMBODIMENT

Figure 1:
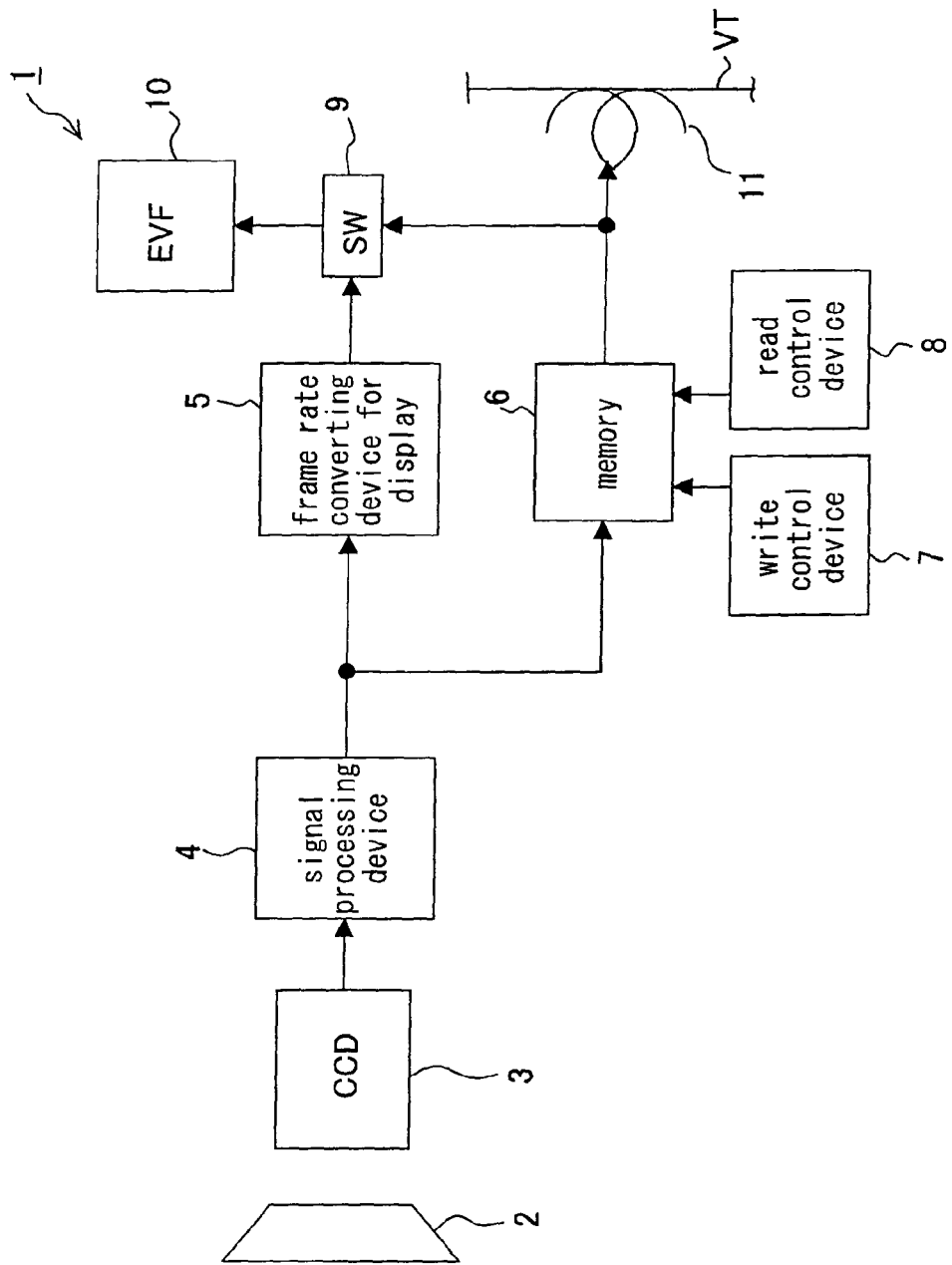
FIG. 1 is a block diagram illustrating a constitution of a television camera according to an embodiment of the present invention.

Before a preferred embodiment of the present invention is described, an image processing operation in an image processing system in which a frame rate converting device and a television camera are combined is described referring to FIGS. 12 and 13. A television camera according to the present invention results from the improvement of the image processing operation in the foregoing image processing system. In the image processing system, as the television camera is used a television camera in which a recording device is integrally incorporated having an image pickup device (CCD device or the like) capable of optionally setting a frame rate.

A processing step shown in FIG. 12 is described. A first video signal picked up at a frame rate of 60 fps in the image pickup device (see FIG. 12(a)) is recorded on a videotape in the television camera as the first video signal of 60 pfs without any change (see FIG. 12(b)). Then, the videotape is installed in a reproducing unit of the frame rate converting device to be thereby reproduced. The reproduced first video signal is subjected to a 2-3 pulldown converting process in the frame rate converting device. To describe the 2-3 pulldown converting process, one of a couple of frame data adjacent to each other in frame data constituting the first video signal (for example, frame data represented by "3" and "4" in the drawing) is disposed twice in a duplicating manner parallel to each other (for example, "3" and "3"), while the other is disposed three times in the duplicating manner parallel to one another (for example, "4", "4" and "4"), in which case, however, the frame rate conversion is executed in such manner that the respective pre-conversion frame data can synchronize with the respective post-conversion frame data. Therefore, the frame rate remains unchanged before and after the conversion, and the respective frame data are stored in the time cycle of $1/60$ sec with no change before and after the conversion.

A second video signal after the foregoing frame rate conversion is implemented thereto, is subjected to the 2-3 pulldown converting process so that a frame data storage cycle for two frames in the pre-conversion video signal ($2 \times 1/60$ sec=$1/30$ sec) is elongated to $5 \times 1/60$ sec=$1/12$ sec. Therefore, the reproduction of the post-conversion video signal results in a slow reproduction at the 1/2.5-fold speed.

A processing step shown in FIG. 13 is described. First, in the image pickup device, the first video signal picked up at the frame rate of 12 fps (see FIG. 13(a)) is processed into a processed video signal in a signal processing circuit in the television camera. The processed video signal is generated by superimposing the first video signal on the frame data of 60 fps (see FIG. 13(b)), in which case the frame data in one frame ($1/12$ sec in terms of time) of the first video signal is disposed in the duplicating manner in five frames ($5 \times 1/60$ sec=$1/12$ sec in terms of time) of the processed video signal. The processed video signal thereby generated is recorded on the videotape.

The videotape is installed in the reproducing unit of the frame rate converting device to be thereby reproduced. The reproduced processed video signal is subjected to the before-mentioned 2-3 pulldown converting process in the frame rate converting device in the same manner. However, because the frame data equivalent to the five frames are disposed in the duplicating manner in the processed video signal, only a single frame data determined as effective among the duplicated frame data is retrieved and subjected to the 2-3 pulldown converting process (see FIG. 13(c)).

The second video signal after the foregoing frame rate converting process is implemented thereto is subjected to the 2-3 pulldown converting process so that the storage time cycle of the frame data equivalent to two frames in the first video signal ($2 \times 1/12$ sec=$1/6$ sec) is compressed to $5 \times (1/60$ sec)=$1/12$ sec after the conversion. Therefore, the reproduction of the post-conversion video signal results in a fast reproduction of the twofold speed.

Next, a preferred embodiment of the present invention is described in detail referring to FIG. 1. FIG. 1 is a block diagram illustrating a television camera 1 according to the preferred embodiment of the present invention. The television camera 1, in which a progressive video signal of 60 fps (hereinafter referred to as 60 p video signal) is employed as an output standard format, comprises a lens unit 2, an image pickup device 3, a signal processing circuit 4, a frame rate converting unit for display (an exemplified converting device) 5, a memory (an exemplified memory device) 6, a write control device 7, a read control device 8, a selecting switch (an exemplified selecting device) 9, a view finder (an exemplified display device) 10 and a videotape write device (an exemplified recorder) 11.

The lens unit 2 condenses a reflected light from a photographing object not shown in the image pickup device 3. The image pickup device 3 comprises a CCD device or the like and converts the reflected light from the photographing object condensed by the lens unit 2 into an electrical signal. More specifically, the image pickup device 3 converts the reflected light into the electrical signal in accordance with a first frame rate which is optionally settable, or converts the reflected light into the electrical signal by a temporally at-random intermittent imaging to thereby generate and output the first video signal.

The signal processing circuit 4 comprises a digital signal processor or the like, and converts the first video signal outputted from the image pickup device 3 into a digital signal and executes different signal processes for display.

The display frame rate converting device 5 converts the first video signal outputted from the signal processing circuit 4 into a standard video signal (60 p video signal) having a standard frame rate (60 fps) determined by the output standard format of the television camera 1. The display frame rate converting device 5 comprises first, second and third memory sections not shown, and executes the frame rate conversion in such manner that the respective frame data constituting the first video signal are written in the respective memory sections while the memory sections are sequentially shifted as a writing destination and the frame data is read from the respective memory sections while the memory sections are sequentially shifted as a reading destination. The display frame rate converting device 5 thereby generates the standard video signal.

The memory 6 retrieves and memorizes the respective frame data constituting the first video signal outputted from the signal processing circuit 4. The write control device 7 controls the write of the first video signal with respect to the memory 6. The read control device 8 controls the read of the video signal with respect to the memory 6. The selecting switch 9 selects from an output of the display frame rate converting device 5 and an output of the memory 6 and supply the selected output to the view finder 10.

The view finder 10 converts the output of the selecting switch 9 into an image and displays it. The videotape write device 11 writes the output of the memory 6 in a videotape VT.

An operation of the television camera 1 is described referring to timing charts shown in FIGS. 2-10.

In the description below, the video signal outputted from the image pickup device 3 is referred to as the first video signal. The respective frame data constituting the first video signal are referred to as first frame data. The frame rate of the first video signal is referred to as a first frame rate Xp. The video signal having the frame rate determined by the output standard format of the television camera 1 is referred to as the standard video signal. The frame rate of the standard video signal is referred to as a standard frame rate Sp. The first frame data XP sequentially disposed in a partially duplicating manner based on a predetermined arrangement rule in the standard video signal is referred to as the second video signal. In the present embodiment, the standard video signal is defined as the 60 p vide signal, and the standard frame rate is defined as 60 fps. The predetermined arrangement rule refers to an arrangement rule employed when frame data of a video signal having a second frame rate Yp equal to or lower than the standard frame rate Sp (rating frame rate Sp≥ second frame rate Yp) are disposed in the duplicating manner in the standard video signal in such manner that they correspond to one another in terms of real time on the image.

In FIGS. 2-10, a reference symbol Fv denotes effective frame information. The effective frame information Fv is information for determining effective frame data among the frame data disposed in the duplicating manner on the standard video signal, and appropriately appended to the frame data when the frame data is read from the display frame rate converting device 5 and the memory 6.

In the description below, an operation according to the present embodiment is described referring to the case of optionally changing the first frame rate Xp while the standard frame rate Sp is settled at 60 fps and the second frame rate Yp is settled at 24 fps.

Of FIGS. 2-10, FIGS. 2, 4, 6 and 8 show the frame rate converting process executed by the display frame rate converting device 5.

In FIGS. 2, 4, 6 and 8, "A" denotes a signal mode of the first video signal outputted from the image pickup device 3. "B" denotes a signal mode of a write enable signal S1 supplied to first through third memory sections constituting the display frame rate converting device 5. The first through third memory sections are not shown in FIG. 1, however, represented by a ②and ③ in FIGS. 2-9. The write of the first video signal with respect to the display frame rate converting device 5 is controlled by the write enable signal S1. "C" denotes a signal mode of a read control signal S2 supplied to the first through third memory sections constituting the display frame rate converting device 5. The read operation with respect to the display frame rate converting device 5 is controlled by the read control signal S2. "D" denotes a signal mode of an output video signal of the display frame rate converting device 5. The output video signal of the display frame rate converting device 5 is the standard video signal.

Of the foregoing drawings, FIGS. 3, 5, 7, 9 and 10 show the write and read operations with respect to the memory 6.

In FIGS. 3, 5, 7, 9 and 10, "(a)" denotes a signal mode of the first video signal outputted from the image pickup device 3. "(b)" denotes a signal mode of a write control signal S3 for designating respective memory areas in the memory 6. The respective memory areas are not shown in FIG. 1, however, represented by I, II, III in FIGS. 3, 5, 7, 9 and 10. The write of the first video signal with respect to the memory 6 is controlled by the write control signal S3. "(c)" is a schematic view of an input/output state of the memory 6. "(d)" denotes a signal mode of a read control signal S4 supplied to the respective memory areas (represented by I, II, III in the drawings) constituting the memory 6. The read operation with respect to the memory 6 is controlled by the read control signal S4. "(e)" is a signal mode of an output video signal of the memory 6. The output video signal of the memory 6 is the second video signal.

In the Case of First Frame Rate Xp=120 Fps

Figure 2:
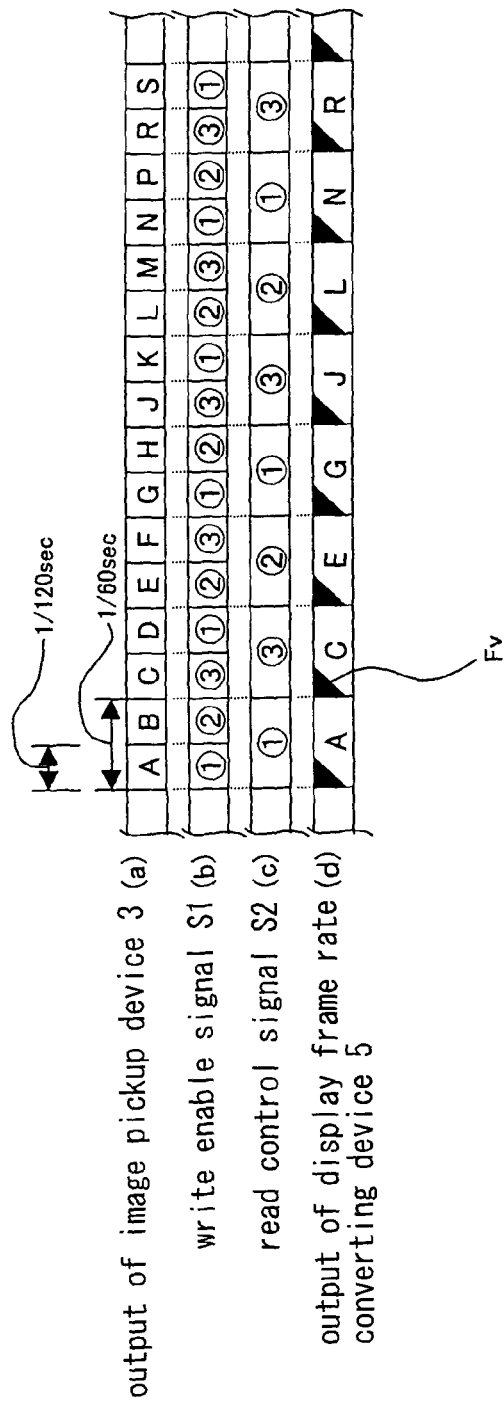
FIG. 2 is a timing chart of an operation of the television camera according to the embodiment.

An operation of the display frame rate converting device 5 in the foregoing case is described referring to a timing chart shown in FIG. 2.

The image pickup device 3 outputs the first video signal having the first frame data (120 fps) (see FIG. 2(*a*)). The first video signal has such a signal mode that the frame data is renewed per ¹⁄₁₂₀ sec based on the set first frame rate Xp (120 fps). The first video signal is inputted to the display frame rate converting device 5 after the different signal processes are implemented thereto in the signal processing circuit 4.

The display frame rate converting device 5 writes the respective first frame data constituting the first video signal in the first through third memory sections thereof while sequentially shifting the memory sections based on the write enable signal S1 (see FIG. 2(*b*)). Further, the display frame rate converting device 5 reads the respective memorized first frame data from the first through third memory sections while sequentially shifting the memory sections based on the read control signal S2 (see FIG. 2(*c*)) to thereby generate and output the standard video signal (see FIG. 2(*d*)).

In the foregoing case, the write enable signal S1 contains the instruction of sequentially changing the first through third memory sections as the writing destination per 1/120 sec. Therefore, the respective first frame data constituting the first video signal is recorded while the recording destination (one of the first through third memory sections) is sequentially renewed per 1/120 sec. Accordingly, the memory contents of the first through third memory sections are respectively renewed per 3×(1/120 sec)=1/40 sec.

The read control signal S2 contains the instruction of sequentially changing the first through third memory sections of the display frame rate converting device 5 as the reading destination per 1/60 sec. In the read control signal S2, a read-change interval is set in accordance with the standard frame rate Sp of the standard video signal (60 fps in the present case). Accordingly, the respective first frame data memorized in the first through third memory sections are read while the reading destination (to be specific, first through third memory sections) is sequentially changed per 1/60 sec.

Further, the first frame rate Xp of the first video signal is 120 fps, while the standard frame rate of the standard video signal is 60 fps, meaning that the first frame data has a frame data volume twice as much as that of the standard frame data. It becomes necessary, therefore, to thin the first video signal to a half when the first video signal (120 fps) is converted into the standard video signal (60 fps), therefore, the following instruction is set in the read control signal S2. To be more specific, the content of the instruction of the read control signal S2 is set such that one of a pair of first frame data memorized in the display frame rate converting device 5 (temporally adjacent to each other) is selectively retrieved in response to the respective frame data output period (1/60 sec) of the standard video signal, while the other is eliminated (thinned). The foregoing method of thinning the frame rate is just an example, allowing any other method to be employed.

The standard video signal is generated by sequentially reading the first frame data in the appropriately thinned state from the first through third memory sections per 1/60 sec. The generated video signal results in the video signal having the frame rate of 60 fps.

A frame data renewal cycle in the first video signal outputted from the image pickup device 3 is 1/120 sec, while a frame data renewal cycle in the standard video signal outputted from the display frame rate converting device 5 is 1/60 sec. However, because the half of the first frame data is thinned when the standard video signal is generated, the real time on the first video signal (passage of time) and the real time on the standard video signal (passage of time) are equal to each other. Further, the image of the standard video signal can gain a natural motion because one of the first frame data is periodically thinned per 1/60 sec when the standard video signal is generated.

The foregoing operation of generating the standard video signal is implemented in real time during the image pickup. The selecting operation of the selecting switch 9 is automatically set as follows during the image pickup. The selecting switch 9 supplies the output of the display frame rate converting device 5 to the view finder 10 during the image pickup, and the image of the first video signal obtained in the image pickup is converted into the standard video signal in real time and displayed by the view finder 10. Therefore, a photographer can visually confirm the image of the standard video signal when he/she watches the view finder 10. The standard video signal displayed at that time is obtained by converting the first video signal without any change to the real time. Therefore, when the image of the standard video signal is visually confirmed by the view finder 10, it substantially corresponds to the visual confirmation the image of the first video signal.

Figure 3:
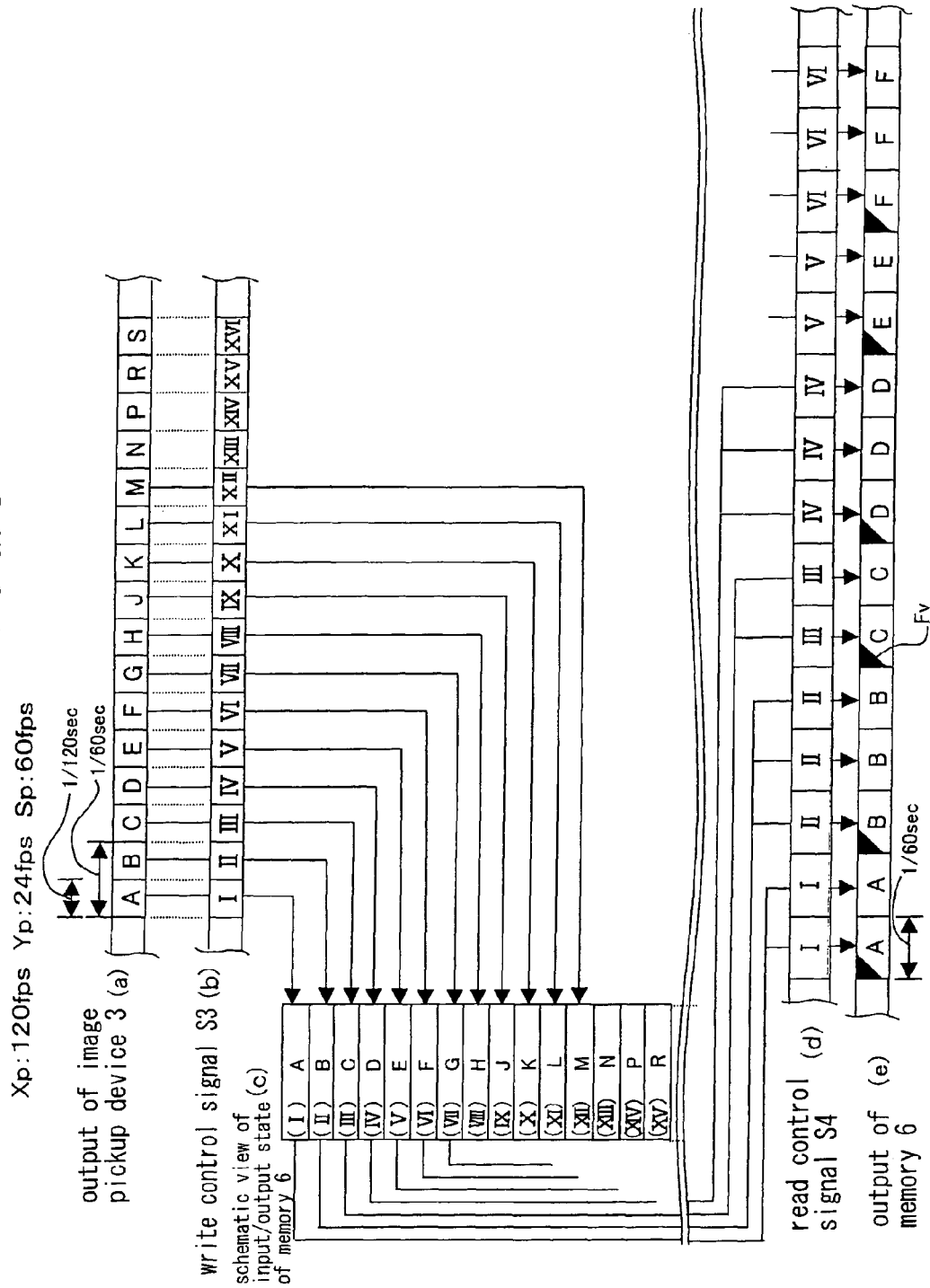
FIG. 3 is a timing chart of an operation of the television camera according to the embodiment.

Next, read and write operations with respect to the memory 6 in the foregoing case are described referring to a timing chart shown in FIG. 3.

First, as shown in FIG. 3(a), the image pickup device 3 outputs the first video signal having the first frame data (120 fps). The first video signal is subjected to the different signal processes in the signal processing circuit 4 and thereafter written in the memory 6. The write operation is controlled by the write control device 7.

The write control device 7 sequentially writes the respective first frame data constituting the first video signal in the respective memory areas of the memory 6 based on the write control signal S3 (see FIG. 3(b)). The memory areas of the memory 6 are respectively provided with the numerals, I, II, III, . . . .

The write control signal S3 contains the instruction of sequentially changing the memory areas (I, II, III, . . . ) of the memory 6 as the writing destination per 1/120 sec. Therefore, the respective first frame data constituting the first video signal are recorded while the recording destination (memory area) is sequentially changed per 1/120 sec.

The operation of writing the first video signal in the memory 6 described above is implemented in real time at the time of the image pickup. Next, the read operation with respect to the memory 6 is described. The data is optionally read from the memory 6 when the image pickup operation is terminated or when an optional length of time has passed since the termination.

First, the instruction of converting the first video signal into the second video signal is inputted to the television camera 1. The instruction is inputted by an operator of the television camera 1 via an input device (not shown) included in the television camera 1.

When the input of the instruction is detected, the read control device 8 outputs the read control signal S4 to the memory 6. The read control signal S4 contains the instruction of sequentially changing the memory areas I, II, III, . . . , of the memory 6 as the reading destination per 1/60 sec. The read control signal S4 further contains the instruction of reading the frame data from the respective memory areas based on the following arrangement rule (reading rule).

The arrangement rule refers to an arrangement rule adopted when the respective frame data of the video signal having the second frame rate Yp (24 fps in the present embodiment) are disposed in the standard video signal (60 p video signal having the frame rate of 60 fps in the present embodiment) in the duplicating manner in such manner that they correspond one another in terms of the real time on the image.

In the present embodiment in which the second frame rate Yp is 24 fps and the standard frame rate Sp is 60 fps, the arrangement rule is more specifically a data arrangement characterized in that a pair of data regions, which are a data region where the frame data equivalent to one frame in the case of 24 fps is disposed in the duplicating manner as the frame data equivalent to two frames in the case of 60 fps and a data region where the frame data equivalent to one frame is disposed in the duplicating manner as the frame data equivalent to three frames, is repeatedly disposed. The arrangement rule is hereinafter referred to as a 2-3 pulldown arrangement rule. The arrangement rule according to the present invention can be implemented provided that the second frame rate Yp is lower than the standard frame rate Sp (Yp≤Sp).

The respective frame data memorized in the respective memory areas I, II, III, . . . , of the memory 6 are read while the memory area as the reading destination is sequentially changed per 1/60 sec based on the read control signal having the 2-3 pulldown arrangement rule.

The second video signal thus read from the memory 6 and generated results in the video signal having the frame rate of 60 fps.

At that time, the frame data renewal cycle in the first video signal is 1/120 sec, while the frame data renewal cycle in the second video signal is 1/60 sec. However, the frame data of the second video signal is arranged based on the foregoing arrangement rule, therefore, an arrangement cycle of the data equivalent to two frames in the first video signal (2×(1/120) sec=1/60 sec) corresponds to an arrangement cycle of the data equivalent to five frames in the second video signal (5×(1/60) sec=1/12 sec).

The real time on the first video signal (passage of time) is consequently elongated fivefold on the second video signal, which results in the slow reproduction in which the real time is elongated fivefold when the second video signal is reproduced.

The foregoing operation of generating the second video signal is implemented at an optional time point after the image pickup. Further, in the operation of generating the second video signal, the selecting operation of the selecting switch 9 is automatically set as follows. During the generation of the second video signal, the selecting switch 9 supplies the output of the memory 6 to the view finder 10, and the generated second video signal is thereby displayed by the view finder 10. Therefore, the photographer can visually confirm the image of the second video signal by watching the view finder 10.

The image of the second video signal displayed at that time is the image in which the real time of the first video signal is elongated fivefold. As a result, when the image of the second video signal is visually confirmed by the view finder 10, it corresponds to the visual confirmation of the slow-production image in which the first video signal is elongated fivefold.

The operator visually checks the second video signal and thereby confirms its time-image effect. The operator, when judging that the expected time-image effect is obtained, inputs a recording instruction to the television camera 1. The recording instruction is inputted via the input device, not shown, included in the television camera 1. The videotape write device 11, in response to the detection of the recording instruction, outputs a read-out instruction with respect to the memory 6 to the read control device 8. The read control device 8 receives the data read-out instruction and thereafter executes the frame data read control in the same manner as the frame data read control described earlier. Thereby, the second video signal is read from the memory 6 and outputted to the videotape write device 11. The videotape write device 11 writes the second video signal supplied by the memory 6 on the videotape VT.

In the Case of First Frame Rate Xp=60 Fps

Figure 4:
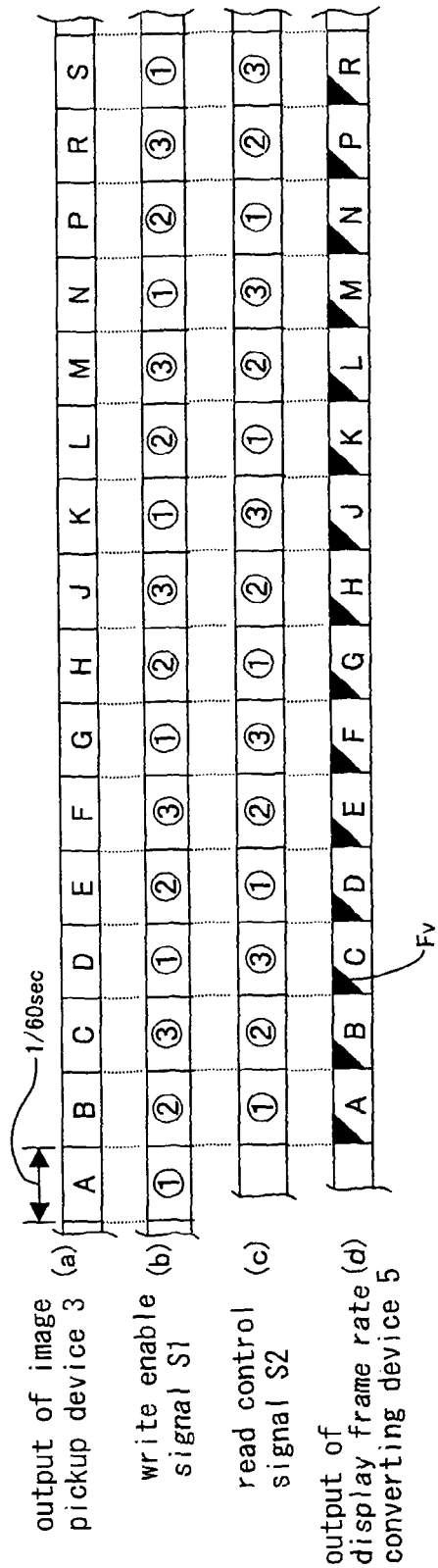
FIG. 4 is a timing chart of an operation of the television camera according to the embodiment.

An operation of the display frame rate converting device 5 in the foregoing case is described referring to a timing chart shown in FIG. 4

First, the image pickup device 3 outputs the first video signal having the first frame data (60 fps) (see FIG. 4(a)). The first video signal has such a signal mode that the frame data is renewed per 1/60 sec based on the set first frame rate Xp (60 fps). The first video signal is subjected to the different signal processes in the signal processing circuit 4 and thereafter inputted to the display frame rate converting device 5.

The display frame rate converting device 5 sequentially writes the respective first frame data constituting the first video signal in the first through third memory sections of the display frame rate converting device 5 based on the write enable signal S1 (see FIG. 4(b)). Further, the display frame rate converting device 5 reads the memorized respective frame data from the first through third memory sections based on the read control signal S2 (see FIG. 4(c)) and thereby generates and outputs the standard video signal (see FIG. 4(d)).

The write enable signal S1 contains the instruction of sequentially changing the first through third memory sections as the writing destination per 1/60 sec, and the respective first frame data constituting the first video signal are accordingly recorded while the recording destination (one of the first through third memory sections) is sequentially changed per 1/60 sec. Therefore, the memory content is renewed per 3×(1/60 sec)=1/20 sec in each of the first through third memory sections.

The read control signal S2 contains the instruction of sequentially changing the first through third memory sections of the display frame rate converting device 5 as the reading destination per 1/60 sec. In the read control signal S2, the read-change interval is set in accordance with the standard frame rate Sp (60 fps in the present case) of the standard video signal. Therefore, the respective frame data memorized in the first through third memory sections are read while the reading destination is sequentially changed (to be specific, first through third memory sections) per 1/60 sec. Thereby, the frame data is sequentially read from the first through third memory sections per 1/60 sec, which generates the standard video signal. The generated standard video signal is the standard video signal having the standard frame rate Sp of 60 fps.

The renewal cycle of the first frame data in the first video signal outputted from the image pickup device 3 is 1/60 sec, while the renewal cycle of the standard frame data in the standard video signal outputted from the display frame rate converting device 5 is 1/60 sec. Accordingly, the real time (passage of time) on the first video signal and the real time (passage of time) on the standard video signal are equal to each other.

The foregoing operation of generating the standard video signal is implemented in real time during the image pickup. Further, during the image pickup, the selecting operation of the selecting switch 9 is automatically set as follows. The selecting switch 9 supplies the output of the display frame rate converting device 5 to the view finder 10. Therefore, the first video signal obtained by the image pickup is converted into the standard video signal in real time and displayed by the view finder 10. The photographer can, therefore, visually confirm the image of the standard video signal by watching the view finder 10. The image of the standard video signal displayed at that time is obtained by converting the first video signal without any change to the real time. Therefore, when the image of the standard video signal is visually confirmed by the view finder 10, it substantially corresponds to the visual confirmation of the image of the first video signal.

Figure 5:
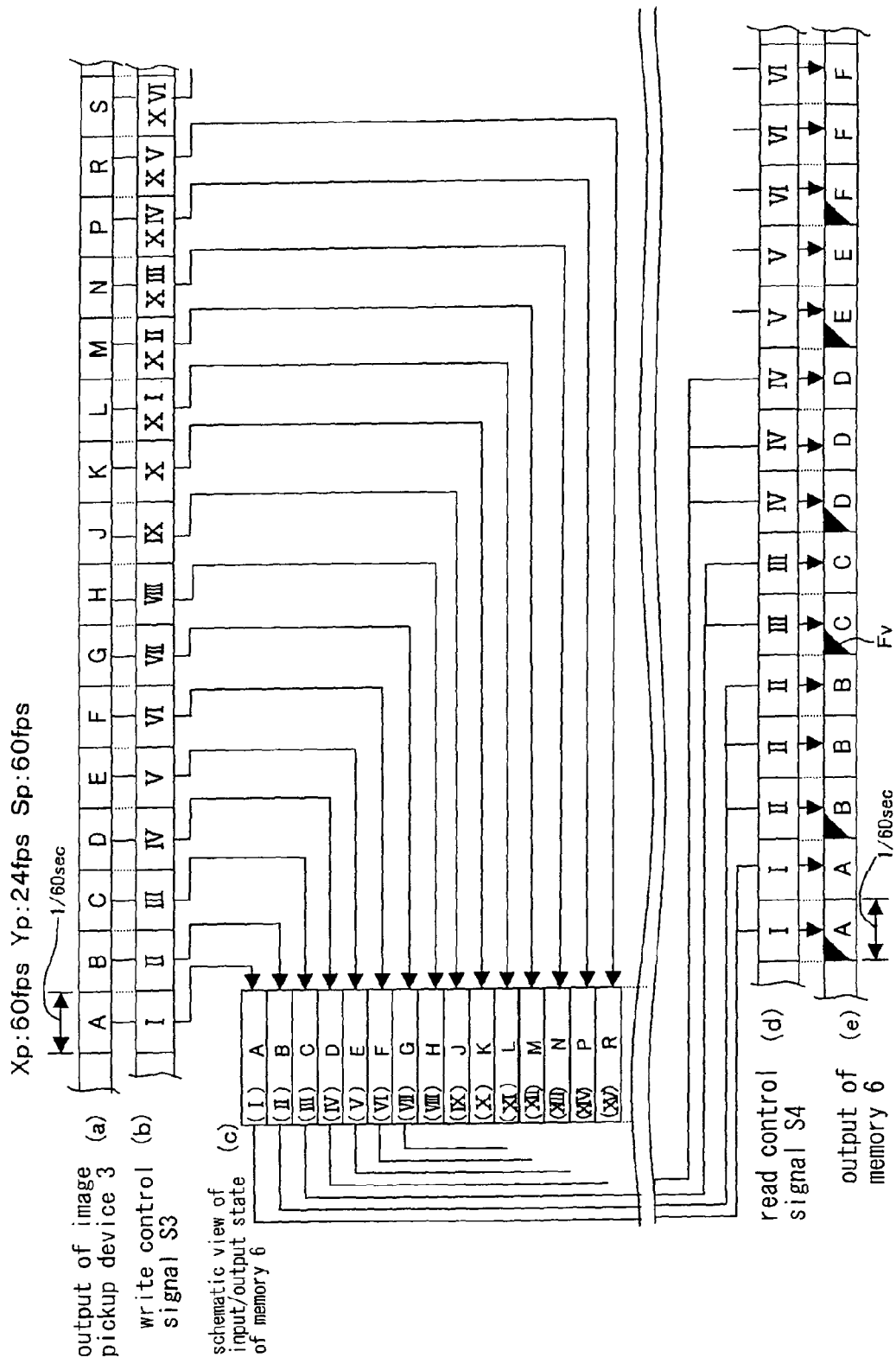
FIG. 5 is a timing chart of an operation of the television camera according to the embodiment.

Next, read and write operations with respect to the memory 6 in the present case are described referring to a timing chart shown in FIG. 5.

First, as shown in FIG. 5(a), the image pickup device 3 outputs the first video signal having the first frame data (60 fps). The first video signal is subjected to the different signal processes in the signal processing circuit 4 and thereafter written in the memory 6. The write operation is controlled by the write control device 7.

The write control device 7 sequentially writes the respective frame data constituting the first video signal in the respective memory areas of the memory 6 based on the write control signal S3 (see FIG. 5(b)). In FIG. 3, the memory areas of the memory 6 are respectively provided with the numerals I, II, III, . . . .

The write control signal S3 contains the instruction of sequentially changing the memory areas (I, II, III, . . . ) of the memory 6 as the reading destination per 1/60 sec. Accordingly, the respective first frame data constituting the first video signal are recorded while the recording destination (memory area) is sequentially shifted per 1/60 sec.

The operation of writing the first video signal in the memory 6 described above is implemented in real time at the time of the image pickup. Next, the data read operation with respect to the memory 6 is described. The read operation with respect to the memory 6 is optionally implemented when the image pickup operation is terminated or an optional length of time has passed since the termination.

First, the instruction of converting the first video signal into the second video signal is inputted to the television camera 1. The instruction is inputted by the operator of the television camera 1 via the input device (not shown) included in the television camera 1.

When the input of the instruction is detected, the read control device 8 outputs the read control signal S4 to the memory 6. The read control signal S4 contains the instruction of sequentially changing the respective memory areas I, II, III, . . . , of the memory 6 as the reading destination per 1/60 sec. The read control signal S4 further contains the instruction of reading the frame data from the respective memory areas based on the following arrangement rule (reading rule).

The arrangement rule refers to an arrangement rule employed when the frame data of the video signal having the second frame rate Yp (24 fps in the present embodiment) is disposed in the duplicating manner in the standard video signal (60 p video signal having the frame rate of 60 fps in the present embodiment) in such manner that they correspond to one another in terms of the real time on the image.

In the present embodiment in which the second frame rate Yp is 24 fps and the standard frame rate Sp is 60 fps, the 2-3 pulldown arrangement rule described earlier is employed as the arrangement rule. The arrangement rule according to the present invention is implemented provided that the second frame rate Yp is lower than the standard frame rate Sp (Yp≤Sp).

The respective frame data memorized in the respective memory areas I, II, III, . . . , of the memory 6 are read while the respective memory area is sequentially changed per 1/60 sec based on the read control signal S4 having the foregoing arrangement rule. The second video signal read from the memory 6 and thereby generated is the image signal having the frame rate of 60 fps.

The frame data renewal cycle in the first video signal is 1/60 sec, while the frame data renewal cycle in the second video signal is 1/60 sec. However, because the frame data of the second video signal is disposed based on the arrangement rule, the arrangement cycle of the two-frame data in the first video signal (2×(1/60) sec-1/30 sec) corresponds to the arrangement cycle of the five-frame data in the second video signal (5×1/60) sec=1/12 sec).

Thereby, the real time on the first video signal (passage of time) is elongated 2.5-fold on the second video signal. Therefore, the reproduction of the second video signal results in the slow reproduction in which the real time is elongated 2.5-fold.

The foregoing operation of generating the second video signal is implemented at an optional time point after the image pickup. Further, the selecting operation of the selecting switch 9 while the second video signal is being generated is automatically set as follows. While the second video signal is being generated, the selecting switch 9 supplies the output of the memory 6 to the view finder 10, and the generated second video signal is displayed by the view finder 10. Then, the photographer can visually confirm the second video signal by watching the view finder 10. The image of the second video signal displayed at that time is the image in which the real time on the first video signal is elongated 2.5-fold. Therefore, when the image of the second video signal is visually conformed by the view finder 10, it corresponds to the slow-reproduction image in which the first video signal is elongated 2.5-fold.

The operator visually checks the image of the second video signal and thereby confirms its time-image effect, and inputs the recording instruction to the television camera 1 upon the judgment that the expected time-image effect is obtained. The recording instruction is inputted to the input device, not shown, included in the television camera 1. The videotape write device 11, in response to the detection of the input of the recording instruction, outputs the instruction of reading the data from the memory 6 to the read control device 8. The read control device 8 receives the data read-out instruction and then executes the read control in the same manner as the read control described earlier to thereby read the second video signal from the memory 6 and outputs it to the videotape write device 11. The videotape write device 11 memorizes the second video signal supplied from the memory 6 on the videotape VT.

In the Case of First Frame Rate Xp=24 Fps

Figure 6:
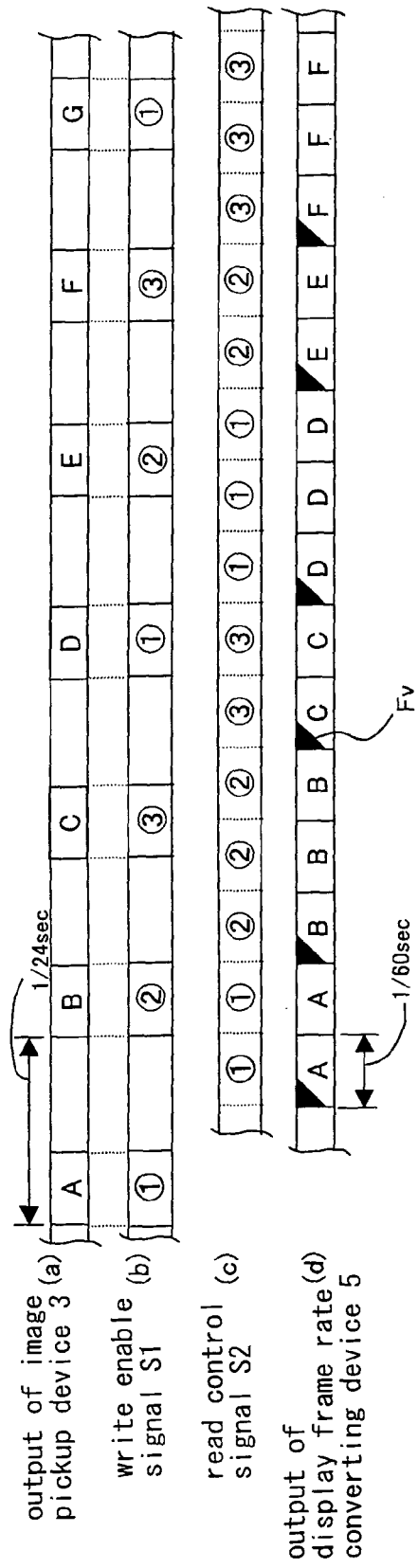
FIG. 6 is a timing chart of an operation of the television camera according to the embodiment.

An operation of the display frame rate converting device 5 in the foregoing case is described referring to a timing chart shown in FIG. 6.

First, the image pickup device 3 outputs the first video signal having the first frame data (24 fps) (see FIG. 6(a)). The first video signal has such a signal mode that the frame data is renewed per 1/24 sec based on the set first frame rate Xp (24 fps). The first video signal is subjected to the different signal processes in the signal processing circuit 4 and thereafter inputted to the display frame rate converting device 5.

The display frame rate converting device 5 sequentially writes the respective frame data constituting the first video signal in the first through third memory sections of the display frame rate converting device 5 based on the write enable signal S1 (see FIG. 6(b)). Further, the display frame rate converting device 5 reads the memorized respective frame data from the first through third memory sections based on the read control signal S2 (see FIG. 6(c)) and thereby generates and outputs the standard video signal (see FIG. 6(d)).

In the foregoing case, the write enable signal S1 contains the instruction of sequentially changing the first through third memory sections as the writing destination per 1/24 sec. Then, the respective first frame data constituting the first video signal are recorded while the recording destination are recorded while the recording destination (one of the first through third memory sections) is sequentially changed per 1/24 sec. Therefore, the recording content is renewed per 3×(1/24 sec)=1/8 sec in each of the first through third memory sections.

The read control signal S2 contains the instruction of sequentially changing the first through third memory sections of the display frame rate converting device 5 as the reading destination per 1/60 sec. In the read control signal S2, the read-change interval is set in accordance with the standard frame rate Sp of the standard video signal (60 fps in the present case). Accordingly, the respective frame data memorized in the first through third memory sections are read while the reading destination (to be specific, the first through third memory sections) is sequentially changed per 1/60 sec.

Further, the first frame rate Xp of the first video signal is 24 fps, while the standard frame rate Sp of the standard video signal is 60 fps, meaning that the standard frame data of the first video signal only has a data volume of 1/2.5 times as much as the standard frame data of the standard video signal. Because of that, when the first video signal (24 fps) is converted into the standard video signal (60 fps), it is necessary to increase the first frame data of the first video signal 2.5-fold. Then, the read control signal S2 reads the respective first frame data of the first video signal from the first through third memory sections in conformity with the before-mentioned 2-3 pulldown arrangement rule.

As a result, the standard video signal generated by sequentially reading the first frame data from the first through third memory sections per 1/60 sec results in the standard video signal having the frame rate of 60 fps.

The renewal cycle of the first frame data in the first video signal outputted from the image pickup device 3 is 1/24 sec, while the renewal cycle of the standard frame data in the standard video signal outputted from the display frame rate converting device 5 is 1/60 sec. However, because the frame data of the first video signal is increased 2.5-fold when the standard video signal is generated, the real time on the first video signal (passage of time) and the real time on the standard video signal (passage of time) are equal to each other. Further, when the standard video signal is generated, the first video signal is converted into the standard video signal based on the given arrangement rule, which is the 2-3 pulldown arrangement rule. Therefore, the motion of the image in the standard video signal becomes natural.

The foregoing operation of generating the standard video signal is implemented in real time during the image pickup. Further, the selecting operation of the selecting switch 9 is automatically set during the image pickup as follows. The selecting switch 9 supplies the output of the display frame rate converting device 5 to the view finder 10 during the imaging operation. The first video signal obtained by the imaging operation is thereby converted into the standard video signal in real time and displayed by the view finder 10. Then, the photographer can visually confirm the image of the standard video signal by watching the view finder 10. The image of the standard video signal displayed at that time is the image of the video signal in which the first video signal is converted without any change to the real time. As a result, when the image of the standard video signal is visually confirmed by the view finder 10, it substantially corresponds to the visual confirmation of the image of the first video signal in real time.

Figure 7:
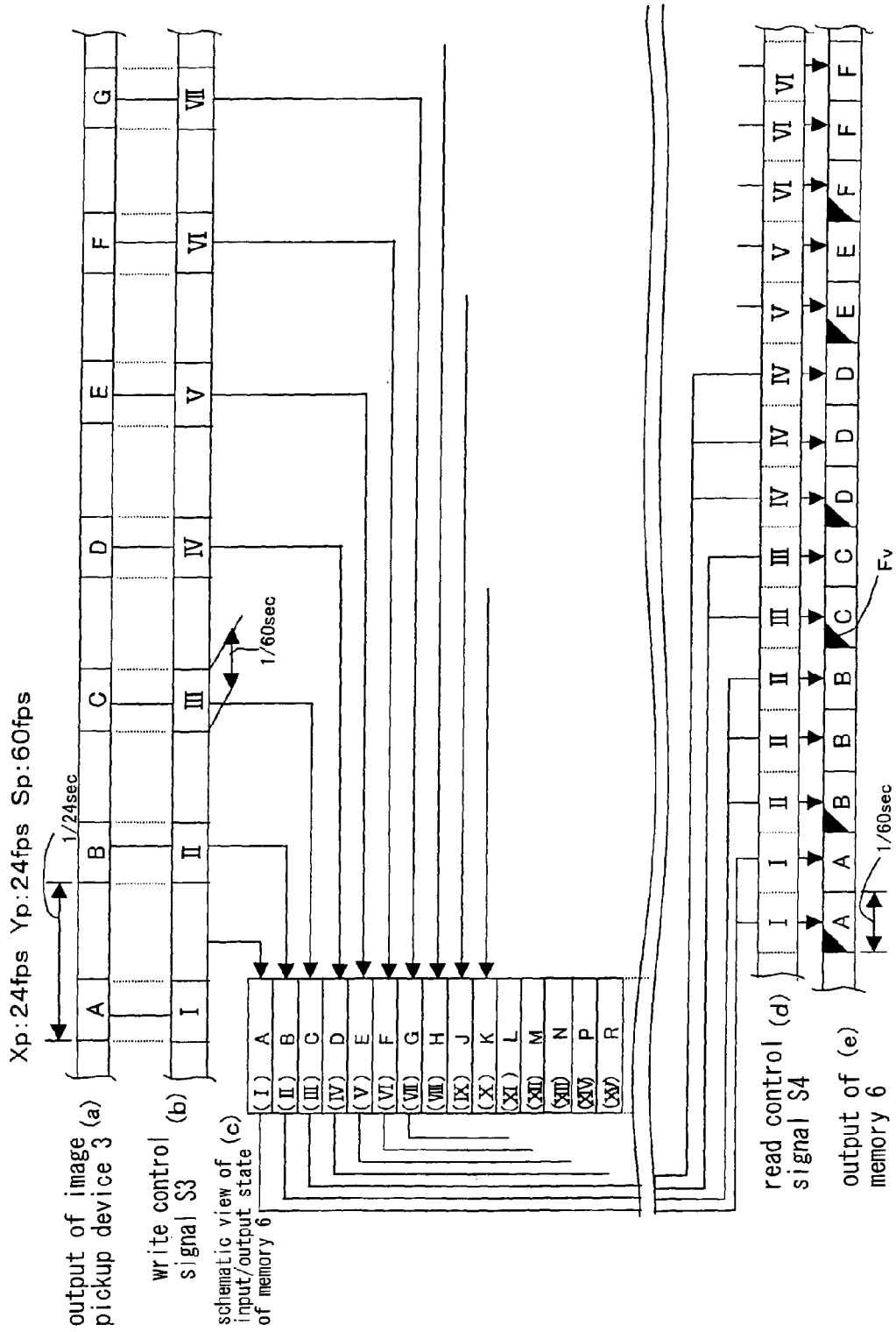
FIG. 7 is a timing chart of an operation of the television camera according to the embodiment.

Next, write and read operations with respect to the memory 6 in foregoing case are described referring to a timing chart shown in FIG. 7.

First, as shown in FIG. 7(a), the image pickup device 3 outputs the first video signal having the first frame data (24 fps). The first video signal is subjected to the different signal processes in the signal processing circuit 4 and thereafter written in the memory 6. The write operation is controlled by the write control device 7.

The write control device 7 sequentially writes the respective first frame data constituting the first video signal in the respective memory areas of the memory 6 based on the write control signal S3 (see FIG. 7(b)). In FIG. 7, the memory areas of the memory 6 are respectively provided with the numerals I, II, III, . . . .

In the present case, the write control signal S3 contains the instruction of sequentially changing the memory areas (I, II, III, . . . ) of the memory 6 as the writing destination per 1/24 sec. Accordingly, the respective first frame data constituting the first video signal are recorded while the recording destination (memory area) is sequentially changed per 1/24 sec.

The foregoing operation of writing the first video signal in the memory 6 is implemented in real time at the time of the imaging operation. Next, the operation of reading the data from the memory 6 is described. The data read operation with respect to the memory 6 is optionally implemented when the image pickup operation is terminated or after an optional length of time has passed since the termination.

First, the instruction of converting the first video signal into the second video signal is inputted to the television camera 1. The instruction is inputted by the operator of the television camera 1 via the input device (not shown) included in the television camera 1.

The read control device 8 outputs the read control signal S4 to the memory 6 when the input of the instruction is detected. The read control signal S3 contains the instruction of sequentially changing the respective memory areas I, II, III, . . . , of the memory 6 as the reading destination per 1/60 sec. The read control signal S4 further contains the instruction of reading the frame data from the respective memory areas based on the following arrangement rule (reading rule).

The arrangement rule refers to an arrangement rule employed when the respective frame data of the video signal having the second frame rate Yp (24 fps in the present embodiment) are arranged in the duplicating manner in the standard video signal (60 p video signal having the frame rate of 60 fps in the present embodiment) in such manner that they correspond to one another in terms of the real time on the image.

In the present embodiment in which the second frame rate Yp is 24 fps and the standard frame rate Sp is 60 fps, the 2-3 pulldown arrangement rule is employed as the arrangement rule.

Based on the read control signal S4 having the foregoing arrangement rule, the respective frame data memorized in the respective memory areas I, II, III, . . . , of the memory 6 are read while the memory area is sequentially changed per 1/60 sec.

The second video signal thus read from the memory 6 and generated is the video signal having the frame rate of 60 fps.

The frame data renewal cycle in the first video signal is 1/24 sec, while the frame data renewal cycle in the second video signal is 1/60 sec. However, because the frame data of the second video signal is arranged based on the foregoing arrangement rule, the arrangement cycle of the data for two frames in the first video signal (2×(1/24) sec=1/12 sec) corresponds to the arrangement cycle of the data for five frames in the second video signal (5×(1/60) sec=1/12 sec).

Thereby, the real time on the first video signal (passage of time) is equal to the real time on the second video signal.

Therefore, the reproduction of the second video signal results in the real-time reproduction.

The foregoing operation of generating the second video signal is implemented at an optional time point after the imaging operation. Further, the selecting operation of the selecting switch 9 is automatically set in the operation of generating the second video signal as follows.

The selecting switch 9 supplies the output of the memory 6 to the view finder 10 during the generation of the second video signal, and the generated second video signal is displayed by the view finder 10. Then, the photographer can visually confirm the second video signal by watching the view finder 10. The passage of time (real time) on the displayed image of the second video signal corresponds to the passage of time (real time) on the first video signal. Accordingly, when the image of the second video signal is visually confirmed by the view finder 10, it corresponds to the visual confirmation of the image obtained by reproducing the first video signal in real time. In other words, the image obtained in the present case is free of any process, to which no time-image effect is exerted.

The operator visually checks the second video signal and thereby confirms its time-image effect, and inputs the recording instruction to the television camera 1 when it is judged that the expected time-image effect is obtained (non-processing image is acceptable). The recording instruction is inputted to the input device of the television camera 1 not shown. The videotape write device 11 detects the input of the recording instruction and accordingly outputs the data read-out instruction with respect to the memory 6 to the read control device 8. Upon the receipt of the data read-out instruction, the read control device 8 implements the read control in the same manner as the before-mentioned read control to thereby read the second video signal from the memory 6 and outputs it to the videotape write device 11. The videotape write device 11 memorizes the second video signal supplied from the memory 6 on the videotape VT.

In the Case of the First Frame Rate XP=12 Fps)

Figure 8:
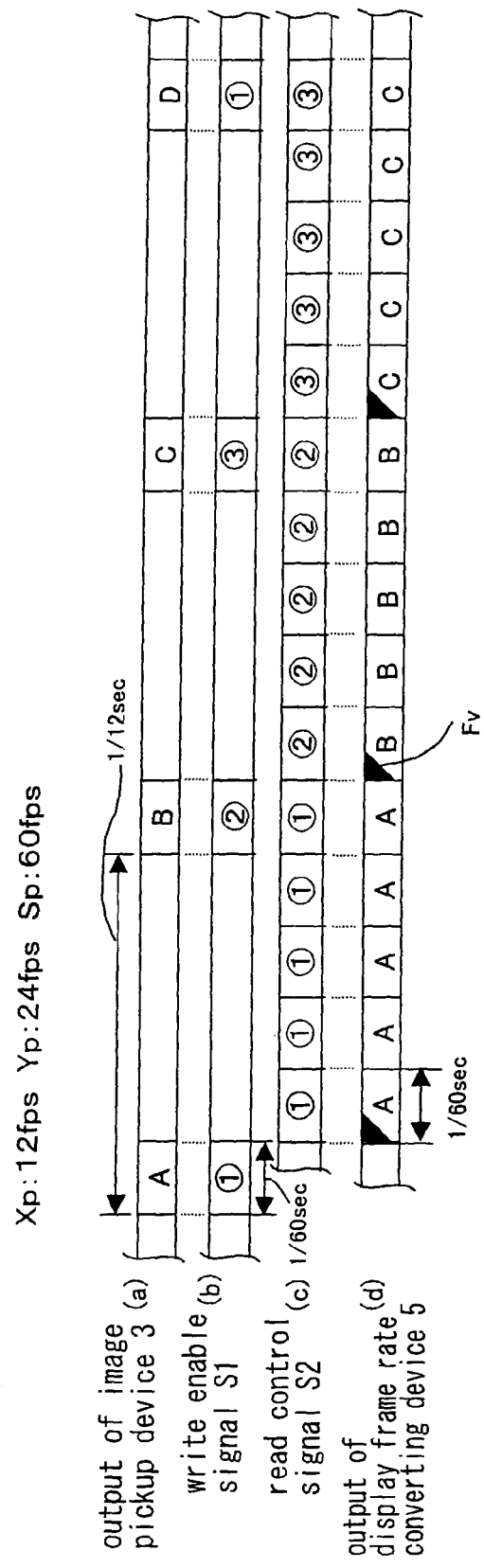
FIG. 8 is a timing chart of an operation of the television camera according to the embodiment.

An operation of the display frame rate converting device 5 in the foregoing case is described referring to a timing chart shown in FIG. 8.

First, the image pickup device 3 outputs the first video signal having the first frame data Xp (12 fps) (see FIG. 8(*a*)). The first video signal has such a signal mode that the frame data is renewed per $1/12$ sec based on the set first frame rate Xp (12 fps). The first video signal is subjected to the different signal processes in the signal processing circuit 4 and thereafter inputted to the display frame rate converting device 5.

The display frame rate unit 5 sequentially writes the respective frame data constituting the first video signal in the first through third memory sections of the display frame rate converting device 5 based on the write enable signal S1 (see FIG. 8(*b*)). Further, the display frame rate converting device 5 reads the memorized respective first frame data from the first through third memory sections based on the read control signal S2 (see FIG. 8(*c*)) and thereby generates and outputs the standard video signal (see FIG. 8(*d*)).

In the present case, the write enable signal S1 contains the instruction of sequentially changing the first through third memory sections as the writing destination per $1/12$ sec. Therefore, the respective first frame data constituting the first video signal are recorded while the recording destination (one of the first through third memory sections) is sequentially renewed per $1/12$ sec. As a result, the memory contents are renewed in the first through third memory sections per $3 \times (1/12 \text{ sec}) = 1/4$ sec.

The read control signal S2 contains the instruction of sequentially changing the first through third memory sections of the display frame rate converting device 5 as the reading destination per $1/60$ sec. In the read control signal S2, the read-change interval is set in compliance with the standard frame rate Sp of the standard video signal (60 fps in the present case). The respective first frame data memorized in the first through third memory sections are read while the reading destination (to be specific, the first through third memory sections) is sequentially changed per $1/60$ sec.

Further, the first frame rate Xp of the first video signal is 12 fps, while the standard frame rate Sp of the standard video signal is 60 fps. The first frame data of the first video signal only has a data volume of $1/5$ times as much as the standard frame data of the standard video signal. Therefore, it becomes necessary to increase the first frame data of the first video signal fivefold when the first video signal (12 fps) is converted into the standard video signal (60 fps). Accordingly, in the read control signal S2 is set the instruction of repeatedly retrieving the first frame data memorized in the display frame rate converting device 5 five times in response to the respective standard frame data output cycles ($1/60$ sec) of the standard video signal.

As a result, the video signal generated by sequentially reading the first frame data from the first through third memory sections per $1/60$ sec results in the standard video signal having the standard frame rate Sp of 60 fps.

At that time, the frame data renewal cycle in the first video signal outputted from the image pickup device 3 is $1/12$ sec, while the frame data renewal cycle in the standard video signal outputted from the display frame rate converting device 5 is $1/60$ sec. However, when the standard video signal is generated, the first frame data of the first video signal is increased fivefold. Therefore, the real time (passage of time) on the first video signal and the real time (passage of time) on the standard video signal are equal to each other. Further, the first frame data of the first video signal is periodically increased five times per $1/60$ sec when the standard video signal is generated, which makes the motion of the image in the standard video signal relatively natural.

The foregoing operation of generating the standard video signal is implemented in real time during the imaging operation. Further, the selecting operation of the selecting switch 9 is automatically set during the imaging as follows. The selecting switch 9 supplies the output of the display frame rate converting device 5 to the view finder 10 during the imaging. Then, the first video signal obtained in the imaging operation is converted into the standard video signal in real time and displayed by the view finder 10. The photographer can visually confirm the image of the standard video signal in real time by watching the view finder 10. The image of the standard video signal displayed at that time is the image of the video signal in which the first video signal is converted without any change to the real time. As a result, when the image of the standard video signal is visually confirmed by the view finder 10, it substantially corresponds to the visual confirmation of the image of the first video signal in real time.

Figure 9:
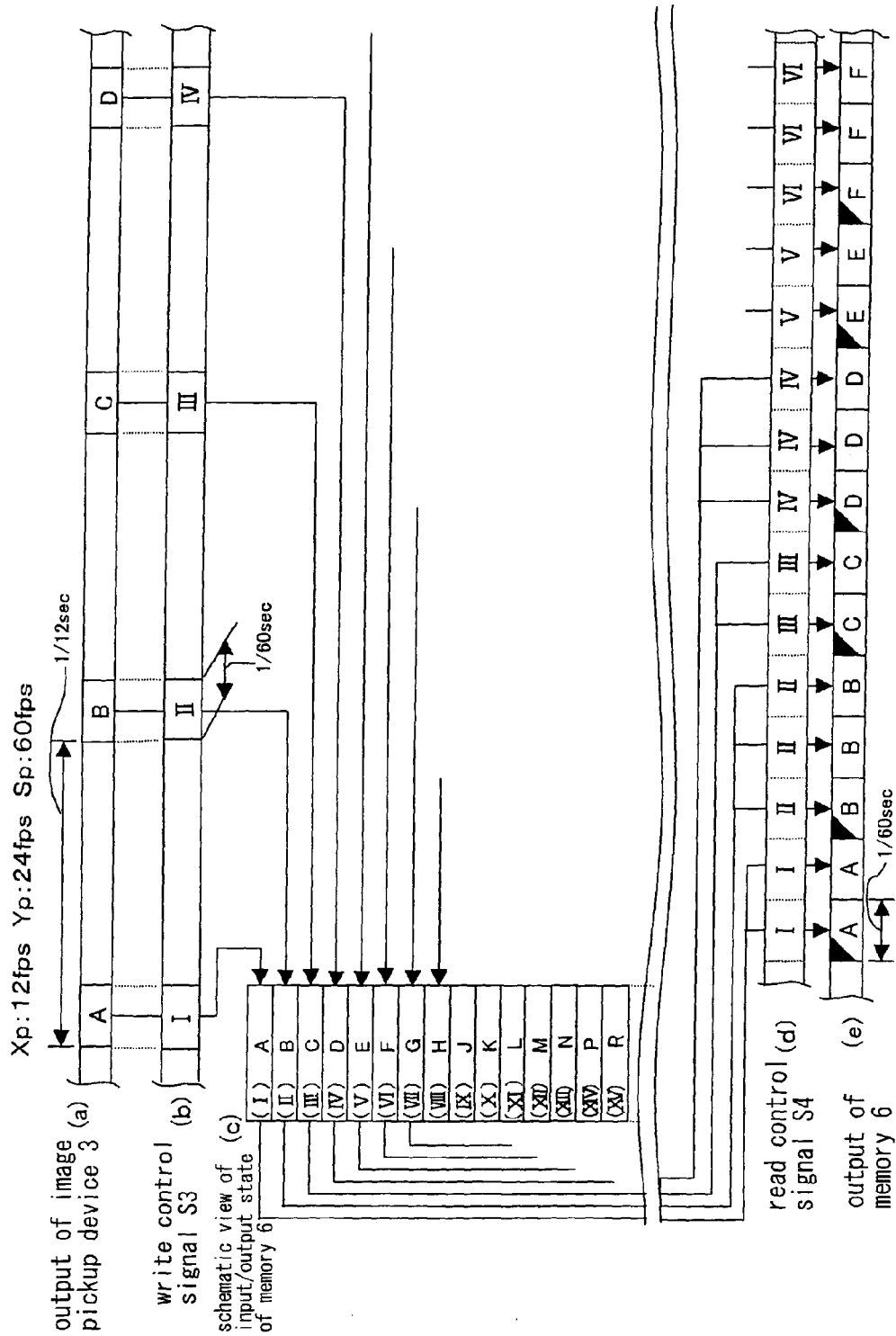
FIG. 9 is a timing chart of an operation of the television camera according to the embodiment.

Next, read and write operations with respect to the memory 6 in the present case are described referring to a timing chart shown in FIG. 9.

First, as shown in FIG. 9(*a*), the image pickup device 3 outputs the first video signal having the first frame rate Xp (12 fps). The first video signal is subjected to the different signal processes in the signal processing circuit 4 and thereafter written in the memory 6. The write operation is controlled by the write control device 7.

The write control device 7 sequentially writes the respective first frame data constituting the first video signal in the respective memory areas of the memory 6 based on the write control signal S3 (see FIG. 9(b)). In FIG. 9, the memory areas of the memory 6 are respectively provided with the numerals I, II, III, . . . .

In the present case, the write control signal S3 contains the instruction of sequentially changing the memory areas (I, II, III, . . . ) of the memory 6 as the writing destination per $\frac{1}{12}$ sec. Accordingly, the respective first frame data constituting the first video signal are recorded while the recording destination (memory area) is sequentially changed per $\frac{1}{12}$ sec.

The foregoing operation of writing the first video signal in the memory 6 is implemented in real time during the imaging operation. Next, the operation of reading the data from the memory 6 is described. The data read operation with respect to the memory 6 is optionally implemented when the imaging operation is terminated or when an optional length of time has passed after the termination.

First, the instruction of converting the first video signal into the second video signal is inputted to the television camera 1. The instruction is inputted by the operator of the television camera 1 via the input device (not shown) included in the television camera 1.

The read control device 8 detects the input of the instruction and correspondingly outputs the read control signal S4 to the memory 6. The read control signal S4 contains the instruction of sequentially changing the respective memory areas, I, II, III, . . . , of the memory 6 as the reading destination per $\frac{1}{60}$ sec. The read control signal S4 further contains the instruction of reading the frame data from the respective memory areas based on the following arrangement rule (reading rule).

The arrangement rule refers to an arrangement rule employed when the respective frame data of the video signal (24 p video signal) having the second frame rate Yp (24 fps in the present embodiment) are disposed in the duplicating manner in the standard video signal (60 p video signal having the frame rate of 60 fps in the present embodiment) in such manner that they correspond one another in terms of the real time on the image.

The arrangement rule employed in the present embodiment, in which the second frame rate Yp is 24 fps and the standard frame rate Sp is 60 fps, is the before-mentioned 2-3 pulldown arrangement rule. In order to implement the foregoing arrangement rule according to the present invention, it is necessary for the second frame rate Yp to be lower than the standard frame rate Sp (Yp≤Sp).

Based on the read control signal S4 in conformity with the 2-3 pulldown arrangement rule, the respective frame data memorized in the respective memory areas I, II, III, . . . , of the memory 6 are read while the reading destination is sequentially changed per $\frac{1}{60}$ sec.

The second video signal thus read from the memory 6 and generated results in the video signal having the frame rate of 60 fps.

The frame data renewal cycle in the first video signal is $\frac{1}{12}$ sec, while the frame data renewal cycle in the second video signal is $\frac{1}{60}$ sec. However, because the frame data of the second video signal is disposed based on the foregoing arrangement rule, the arrangement cycle of the two-frame data in the first video signal ($2\times(\frac{1}{12})$ sec=$\frac{1}{6}$ sec) results in the arrangement cycle of the five-frame data in the second video signal ($5\times(\frac{1}{60})$ sec=$\frac{1}{12}$ sec).

Thereby, the real time on the first video signal (passage of time) is contracted 0.5-fold on the second video signal. Therefore, when the second video signal is reproduced, the image in which the real time is contracted 0.5-fold is reproduced.

The foregoing operation of generating the second video signal is implemented at an optional time point after the image pickup. Further, in the operation of generating the second video signal, the selecting operation of the selecting switch 9 is automatically set as follows. During the generation of the second video signal, the selecting switch 9 supplies the output of the memory 6 to the view finder 10, and the generated second video signal is displayed by the view finder 10. Therefore, the photographer can visually confirm the image of the second video signal by watching the view finder 10. The image of the second video signal displayed at that time is the image in which the real time on the first video signal is contracted 0.5-fold. Accordingly, when the image of the second video signal is visually confirmed by the view finder 10, it corresponds to the visual confirmation of the image in which the first video signal is temporally contracted 0.5-fold.

The operator visually checks the image of the second video signal and thereby confirms its time-image effect, and inputs the recording instruction to the television camera 1 when it is judged that the expected time-image effect is obtained. The recording instruction is inputted to the input device, not shown, included in the television camera 1. The videotape write device 11 detects the input of the recording instruction and then outputs the data read-out instruction with respect to the memory 6 to the control unit 8. The control unit 8 receives the data read-out instruction and executes the read control in the same manner as the before-mentioned read control to thereby read the second video signal from the memory 6 and output it to the videotape write device 11. The videotape write device 11 memorizes the second video signal supplied from the memory 6 on the videotape VT.

In the Case of Intermittent Imaging

In the case of the intermittent imaging, the image pickup device 3 picks up the first video signal and outputs all of the frame data constituting the first video signal from the image pickup device 3 in the same manner as in the other cases. The write control device 7 selectively retrieves the frame data spaced with an optional time interval therebetween among all of the frame data constituting the first video signal picked up by the image pickup device 3 and writes the data in the memory 6. In the foregoing manner, the frame data of the first video signal is intermittently written in the memory 6. The frame data to be written in the memory 6 is selected as follows. A time interval at which the frame data is fetched is previously set, and the frame data is automatically written in the memory 6 at the set time interval. Alternatively, a fetching button (not shown) is provided in an operation unit of the television camera 1, and the frame data at the time of the operator's pressing the fetching button is written in the memory 6.

The first video signal picked up by the image pickup device 3 is converted into the standard video signal and displayed by the view finder 10. The operator watches the standard video signal displayed by the view finder 10, and can thereby dynamically check the image being photographed and also confirm the outline of the frame data outputted from the image pickup device 3.

Figure 10:
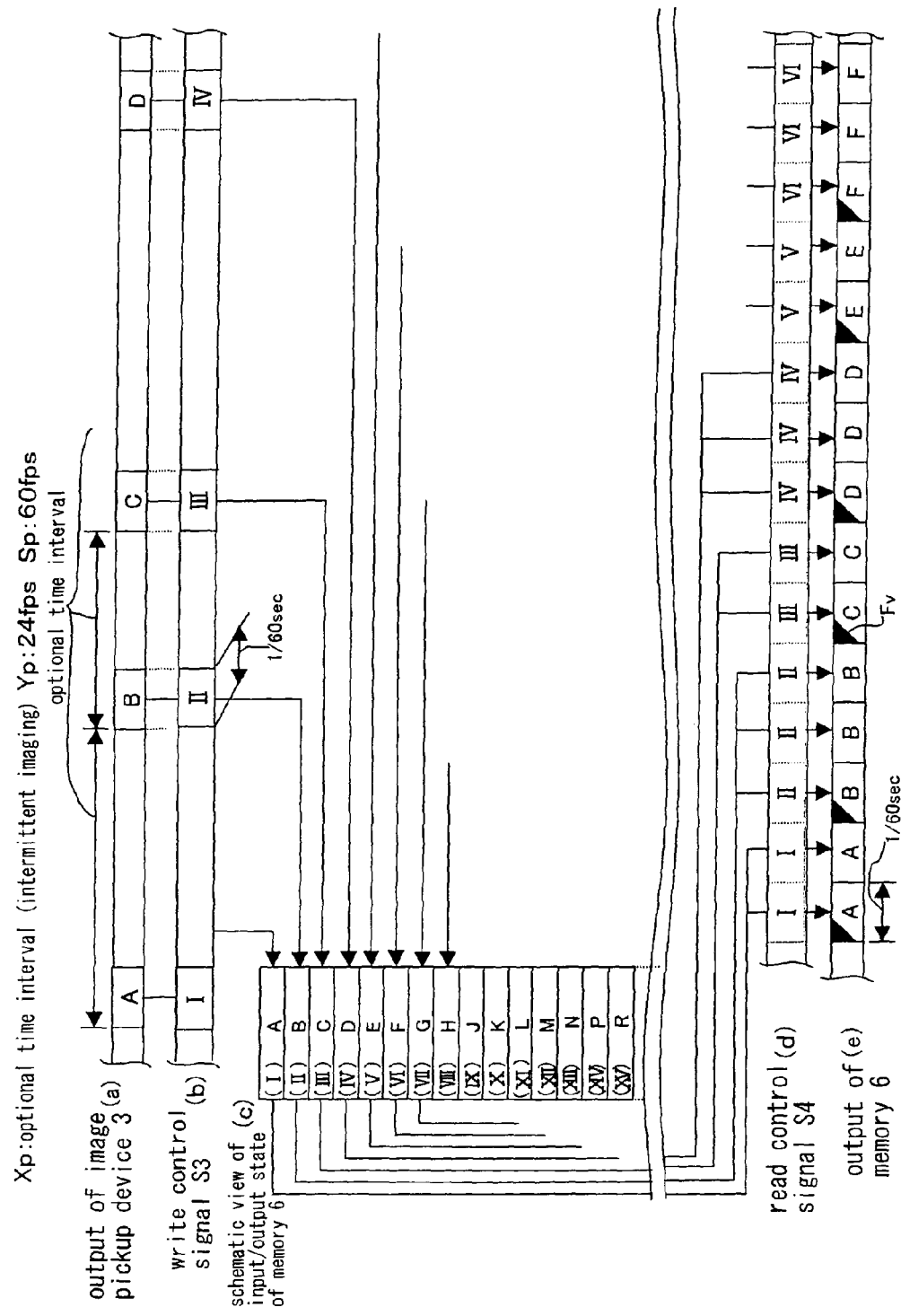
FIG. 10 is a timing chart of an operation of the television camera according to the embodiment.

Referring to a timing chart shown in FIG. 10, read and write operations with respect to the memory 6 in the present case are described.

First, as shown in FIG. 10(a), the image pickup device 3 outputs the frame data of the first video signal thereby picked up. The frame data of the picked-up signal is subjected to the different signal processes in the signal processing circuit 4 and written in the memory 6 under the write control implemented by the write control device 7. The write control device 7 intermittently controls the write of the frame data of the picked-up signal.

The write control device 7 sequentially writes the respective first frame data constituting the first video signal in the respective memory s of the memory 6 based on the write control signal S3 (see FIG. 10(b)). The memory areas of the memory 6 are respectively provided with the numerals I, II, III, . . . .

In the present case, the write control signal S3 contains the instruction of sequentially changing the memory areas (I, II, III, . . . ) of the memory 6 as the writing destination every time when the frame data of the picked-up image is inputted. Accordingly, the frame data of the picked-up image is recorded while the recording destination (memory area) is sequentially changed at each predetermined time interval. Hereinafter, the frame data of the picked-up image intermittently written in the memory areas (I, II, III, . . . ) of the memory 6 is referred to intermittent imaging frame data.

The foregoing operation of intermittently writing the frame data of the picked-up image in the memory 6 is implemented in real time at the time of the imaging. Next, the operation of reading the data from the memory 6 is described. The data read operation with respect to the memory 6 is implemented after a certain volume of intermittent imaging frame data is stored in the memory 6. It is needless to say that the intermittent imaging frame data cannot be stored in the memory 6 beyond the memory capacity thereof.

First, the instruction of converting the intermittent imaging frame data into the second video signal is inputted to the television camera 1. The instruction is inputted by the operator of the television camera 1 to the input device (not shown) included in the television camera 1.

The read control device 8 detects the input of the instruction and then outputs the read control signal 4 to the memory 6. The read control signal S4 contains the instruction of sequentially changing the respective memory areas I, II, III, . . . , of the memory 6 as the reading destination per 1/60 sec. The read control signal S4 further contains the instruction of reading the frame data from the respective memory areas based on the following arrangement rule (reading rule).

The arrangement rule refers to an arrangement rule employed when the respective frame data of the video signal (24 p video signal) having the second frame rate Yp (24 fps in the present embodiment) are arranged in the duplicating manner in the standard video signal (60 p video signal having the frame rate of 60 fps in the present embodiment) in such manner that they correspond to one another in terms of the real time on the image.

The arrangement rule employed in the present embodiment, in which the second frame rate Yp is 24 fps and the standard frame rate Sp is 60 fps, is the 2-3 pulldown arrangement rule. The foregoing arrangement rule according to the present invention can be implemented provided that the second frame rate Yp is lower than the standard frame rate Sp (Yp≤Sp).

Based on the read control signal S4 in conformity with the 2-3 pulldown arrangement rule, the respective intermittent imaging frame data memorized in the respective memory areas I, II, III, . . . , of the memory 6 are read while the memory area is sequentially changed per 1/60 sec. The second video signal thus read from the memory 6 and generated is the video signal having the frame rate of 60 fps.

In the foregoing operation, the intermittent imaging frame data is generated in the intermittent write operation with respect to the memory 6, while the frame data renewal cycle in the second video signal is 1/60 sec.

Therefore, the intermittent imaging frame data, which is an aggregate of the still images retrieved in the intermittent write operation, results in a moving image changing per 1/60 sec on the second video signal. As a result, the reproduction of the second video signal results in the reproduced image in which the still image is artificially transformed into the moving image (animated image).

The foregoing operation of generating the second video signal is implemented at an optional time point after the imaging operation. Further, while the second video signal is being generated, the selecting operation of the selecting switch 9 is automatically set as follows. During the generation of the second video signal, the selecting switch 9 supplies the output of the memory 6 to the view finder 10, and the generated second video signal is displayed by the view finder 10. Then, the photographer can visually confirm the image of the second video signal by watching the view finder 10. In the image of the second video signal displayed at that time, the intermittent frame data is artificially transformed into the moving image. Therefore, when the second video signal is visually confirmed by the view finder 10, it corresponds to the visual confirmation of the intermittent frame data artificially transformed into the moving image.

The operator checks the time elongation/contraction effect on the image by watching the image of the second video signal, and inputs the recording instruction to the television camera 1 when judging that the expected time elongation/contraction effect (artificial moving image) is obtained. The recording instruction is inputted to the input device, not shown, included in the television camera 1. The videotape write device 11 detects the input of the recording instruction and then outputs the data read-out instruction with respect to the memory 6 to the read control device 8. The read control device 8, in response to the receipt of the data read-out instruction, implements the read control in the same manner as the before-mentioned read control to thereby read the second video signal from the memory 6 and output it to the videotape write device 11. The videotape write device 11 memorizes the second video signal supplied from the memory 6 on the videotape VT.

In the embodiment described so far, the second frame rate Yp is 24 fps, while the standard frame rate is 60 fps, which is, however, merely an example of the present embodiment, and the standard frame rate Sp can be optionally set to, for example, 50 fps, 30 fps, 25 fps, 24 fps, or the like. The second frame rate Yp can be also set to any optional value as far as it stays below the standard frame rate (Yp≤Sp). The bottom line is, the second frame data is disposed in the duplicating manner based on the predetermined arrangement rule so that the standard video signal can be generated. The present invention is applicable as far as the second frame rate having the foregoing relationship with the standard video signal can be set.

Figure 11:
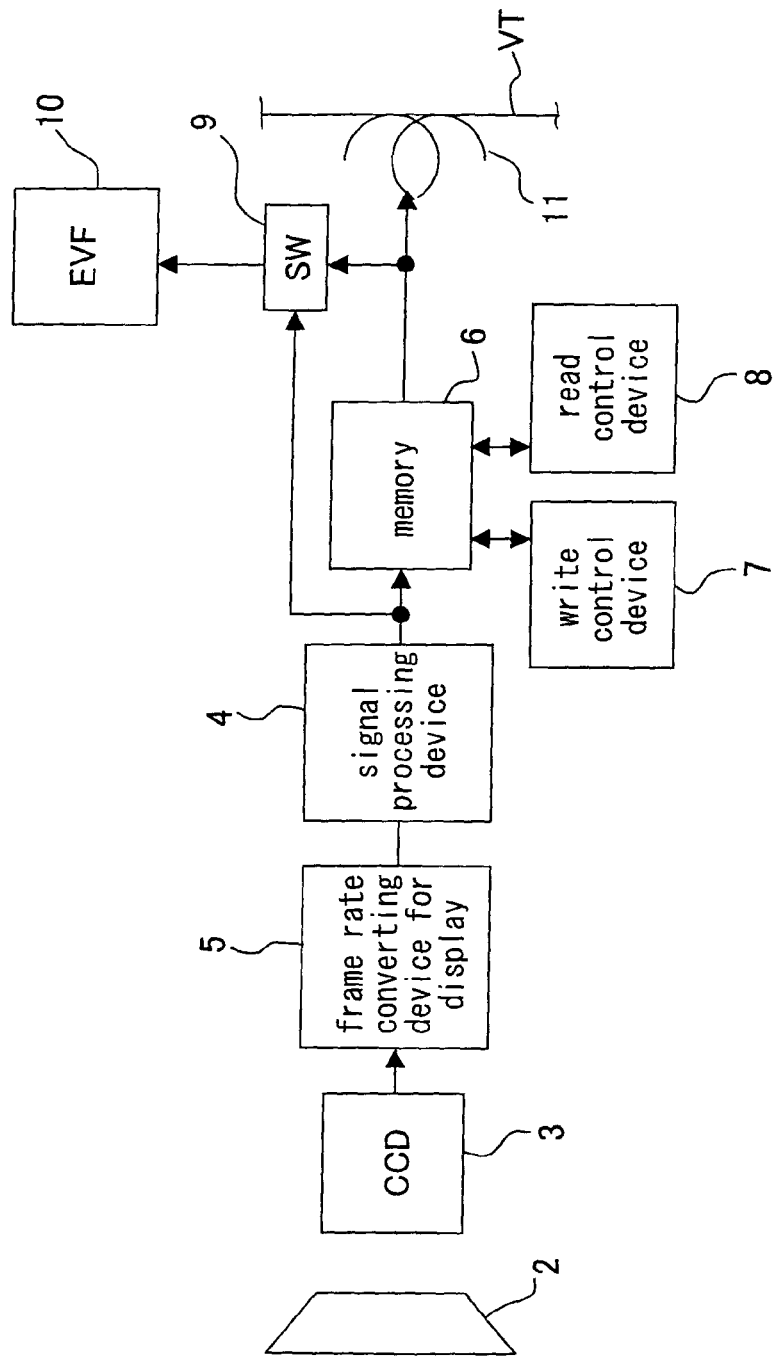
FIG. 11 is a block diagram illustrating a constitution of a television camera according to a modified example of the present invention.

In the foregoing embodiment, the display frame rate converting device 5 and the memory 6 are connected in parallel to the image pickup device 3 so that the display frame rate conversion (first video signal→ standard signal) and the second video signal generation (first video signal→ second video signal) are parallelized. However, as an alternative constitution, the memory 6 may be serially connected on the downstream side of the frame rate converting device 5 in the direction where the signal is communicated, as shown in FIG. 11. According to the foregoing constitution, the second video signal is generated based on the standard video signal obtained by the display frame rate converting process. The present invention is also applicable to the constitution.

In the foregoing embodiment, the second video signal is generated by storing the first frame data in the memory 6 at the time of the imaging operation and collectively reading the stored first frame data from the memory 6 after the imaging operation. However, the second video signal may be alternatively generated by reading the first frame data from the memory 6 simultaneously when the first frame data is stored in the imaging operation. In the foregoing manner, the second video signal can be generated in a shorter period of time though it becomes necessary to increase the capacity of the memory 6 in order to execute the imaging operation in a relatively long period.

Further, when the selecting switch 9 is optionally selected at the time of the imaging operation, the display operation of the view finder 10 can be set in such manner that the real-time image of the picked-up image (image of the standard video signal) and the image after the time-image effect is obtained (image of the second video signal) are displayed by the view finder 10 while one of them is optionally selected.

In the television camera 1 according to the foregoing embodiment, the videotape write device 11 is integrally incorporated in the television camera, however, it is needless to say that the videotape write device 11 can be separately provided as an independent device.

INDUSTRIAL APPLICABILITY

As thus far described, according to the present invention, the television camera alone is capable of outputting the video signal given the time elongation/contraction effect on the image. Further, the time elongation/contraction effect can be obtained without incurring a large increase in the size and cost of the television camera (increase in weight).

What is claimed is:

1. A video processing apparatus comprising:
    an image pickup device for generating a first video signal having a first frame rate optionally settable;
    a memory device for temporarily memorizing the first video signal outputted from the image pickup device;
    a write control device for controlling an operation of writing the first video signal with respect to the memory device;
    a read control device for controlling an operation of reading the video signal memorized in the memory device,
    a converting device for converting the first video signal into a standard video signal,
    a selecting device for selecting a second video signal outputted from the memory device and the standard video signal outputted from the converting device,
    a display device for converting an output of the selecting device into a display image and displaying the display image,
    an input device for accepting a recording instruction operating to record the second video signal outputted from the memory device on a recording medium, wherein
    the write control device controls an operation of writing respective first frame data constituting the first video signal in the memory device in each time cycle determined by the first frame rate,
    the read control device controls an operation of reading the first frame data memorized in the memory device as a second video signal,
    the second video signal has a signal mode in which the respective first frame data are sequentially arranged in a partially duplicating manner in a standard video signal having a standard frame rate determined by an output standard format of the video processing apparatus based on a predetermined arrangement rule, and
    the predetermined arrangement rule is an arrangement rule employed when the respective first frame data constituting a video signal having a second frame rate are arranged in a duplicating manner in the standard video signal in such manner that they correspond to one another in terms of real time on an image.

2. A video processing apparatus as claimed in claim 1, further comprising a recording device for recording the second video signal on a recording medium.

3. A video processing apparatus as claimed in claim 1, wherein the converting device converts the first video signal into the standard video signal having the standard frame rate determined by the output standard format of the video processing apparatus.

4. A video processing apparatus as claimed in claim 1, wherein the second frame rate equal to or lower than the standard frame rate.

5. A video processing apparatus comprising:
    an image pickup device for generating a first video signal having a first frame rate optionally settable;
    a memory device for temporarily memorizing the first video signal outputted from the image pickup device;
    a write control device for controlling an operation of writing the first video signal with respect to the memory device;
    a read control device for controlling an operation of reading the video signal memorized in the memory device,
    the write control device controls an operation of writing respective first frame data constituting the first video signal in the memory device in each time cycle determined by the first frame rate,
    the read control device controls an operation of reading the first frame data memorized in the memory device as a second video signal,
    the second video signal has a signal mode in which the respective first frame data are sequentially arranged in a partially duplicating manner in a standard video signal having a standard frame rate determined by an output standard format of the video processing apparatus based on a predetermined arrangement rule, and
    the predetermined arrangement rule is an arrangement rule employed when the respective first frame data constituting a video signal having a second frame rate are arranged in a duplicating manner in the standard video signal in such manner that they correspond to one another in terms of real time on an image.

* * * * *